US010315777B2

(12) United States Patent
Martins et al.

(10) Patent No.: US 10,315,777 B2
(45) Date of Patent: Jun. 11, 2019

(54) SAFE TAKEOFF MONITORING SYSTEM

(71) Applicant: EMBRAER S.A., Sao Jose dos Compos (BR)

(72) Inventors: Reinaldo Martins, Sao Jose dos Campos (BR); Nelson Seibert, Sao Jose dos Campos (BR)

(73) Assignee: Embraer S.A., São José dos Campos (BR)

( * ) Notice: Subject to any disclaimer, the term of this patent is extended or adjusted under 35 U.S.C. 154(b) by 0 days.

(21) Appl. No.: 13/711,822

(22) Filed: Dec. 12, 2012

(65) Prior Publication Data

US 2013/0211636 A1 Aug. 15, 2013

Related U.S. Application Data

(60) Provisional application No. 61/579,378, filed on Dec. 22, 2011.

(51) Int. Cl.
*G05D 1/00* (2006.01)
*B64D 45/00* (2006.01)

(52) U.S. Cl.
CPC ........... *B64D 45/00* (2013.01); *G05D 1/0083* (2013.01)

(58) Field of Classification Search
None
See application file for complete search history.

(56) References Cited

U.S. PATENT DOCUMENTS

| | | | | |
|---|---|---|---|---|
| 3,066,896 A * | 12/1962 | Schirtzinger | ............. | 244/114 R |
| 4,490,802 A * | 12/1984 | Miller | ........................... | 702/175 |
| 4,837,695 A * | 6/1989 | Baldwin | ......................... | 701/15 |
| 4,843,554 A * | 6/1989 | Middleton et al. | ............. | 701/15 |
| 5,668,541 A | 9/1997 | Coquin et al. | | |
| 6,614,397 B2 | 9/2003 | Pullen et al. | | |
| 7,751,951 B2 * | 7/2010 | Pitard et al. | .................... | 701/15 |
| 7,885,734 B2 * | 2/2011 | Lemoult et al. | ................ | 701/15 |
| 2007/0124034 A1 * | 5/2007 | Pitard et al. | .................... | 701/15 |
| 2008/0215198 A1 * | 9/2008 | Richards | ........................ | 701/15 |
| 2008/0258014 A1 * | 10/2008 | McCoskey | ................ | B60L 7/10 244/221 |
| 2010/0094488 A1 | 4/2010 | Michael et al. | | |
| 2010/0241294 A1 * | 9/2010 | Virelizier | .................. | G01P 5/00 701/14 |
| 2011/0184623 A1 * | 7/2011 | De Boer | ................ | B64D 31/10 701/99 |
| 2015/0005982 A1 * | 1/2015 | Muthukumar | ............ | B60T 1/10 701/1 |

FOREIGN PATENT DOCUMENTS

FR 2 650 101 A1 1/1991

OTHER PUBLICATIONS

Advisory Circular, "Takeoff Safety Training Aid," U.S. Department of Transportation, Federal Aviation Administration, AC No. 120-62, Sep. 12, 1994, 10 pages.

* cited by examiner

*Primary Examiner* — Nicholas K Wiltey

(74) *Attorney, Agent, or Firm* — Nixon & Vanderhye P.C.

(57) ABSTRACT

A safe takeoff monitoring system checks the actual physical parameters of an airplane during takeoff, determines the actual takeoff weight, and warns the pilot to interrupt the takeoff if any dangerous situation is developing, before a high energy abort is necessary.

19 Claims, 12 Drawing Sheets

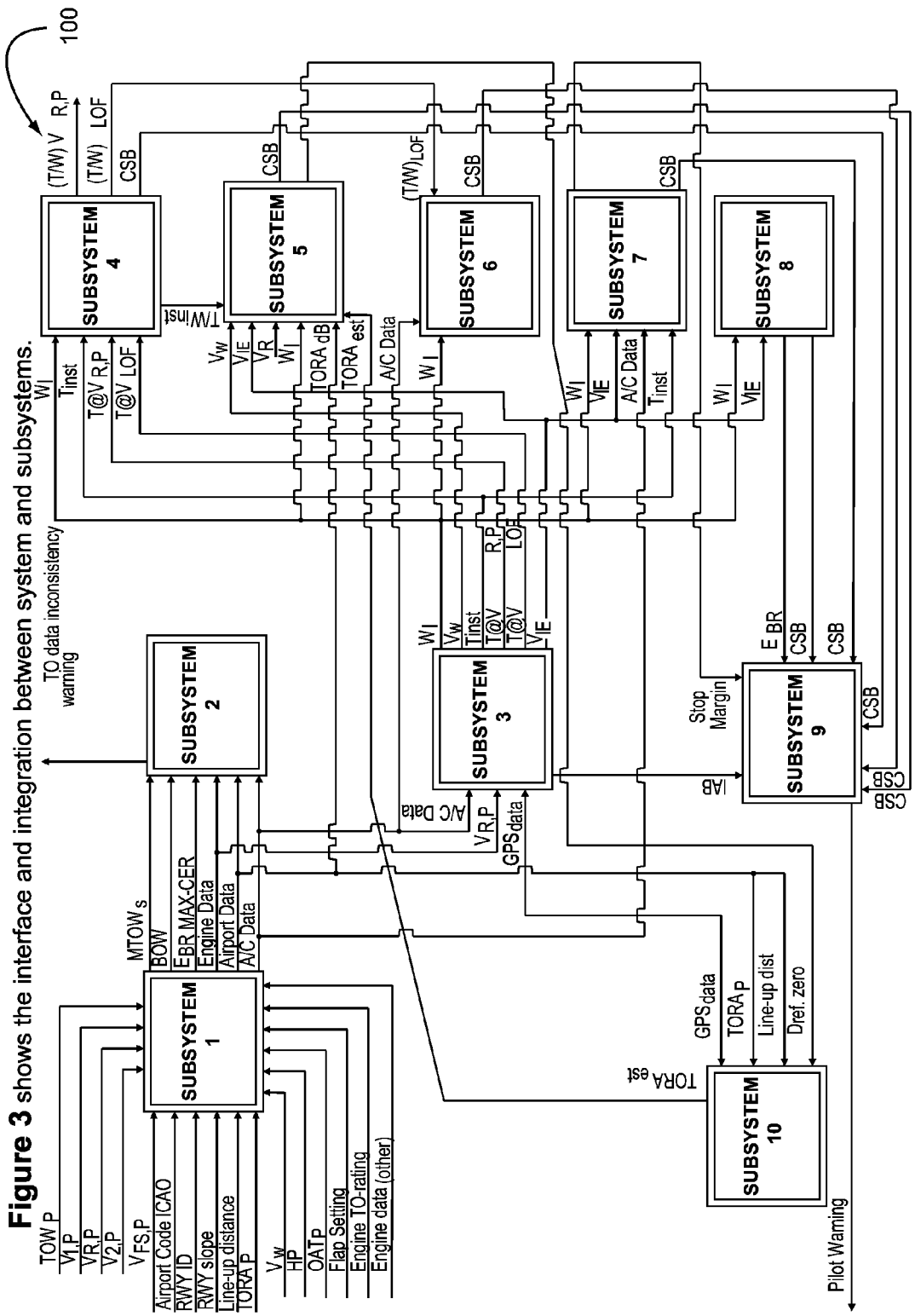
Figure 3 shows the interface and integration between system and subsystems.

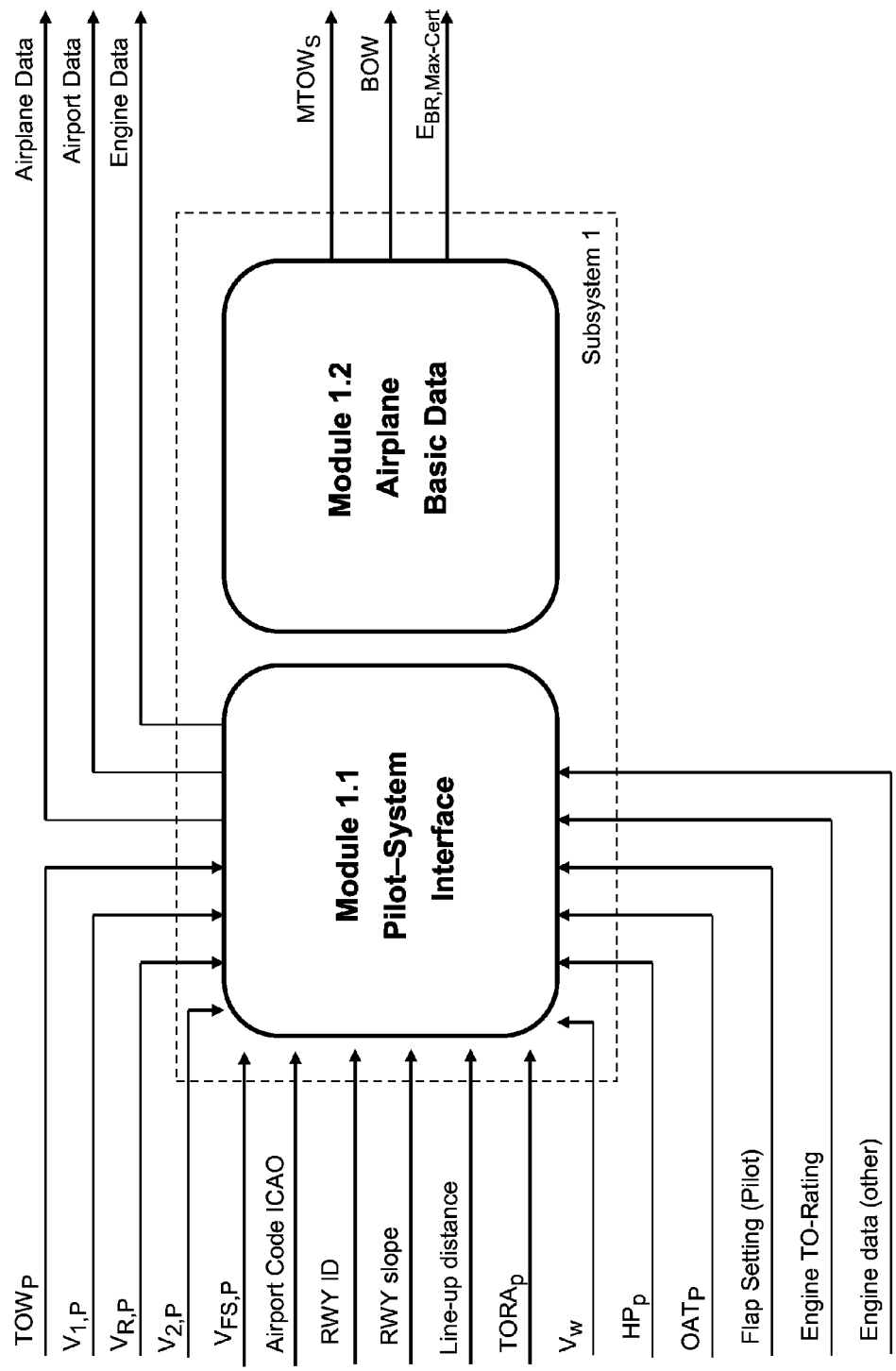
Figure 4 shows the integration between the modules of subsystem 1.

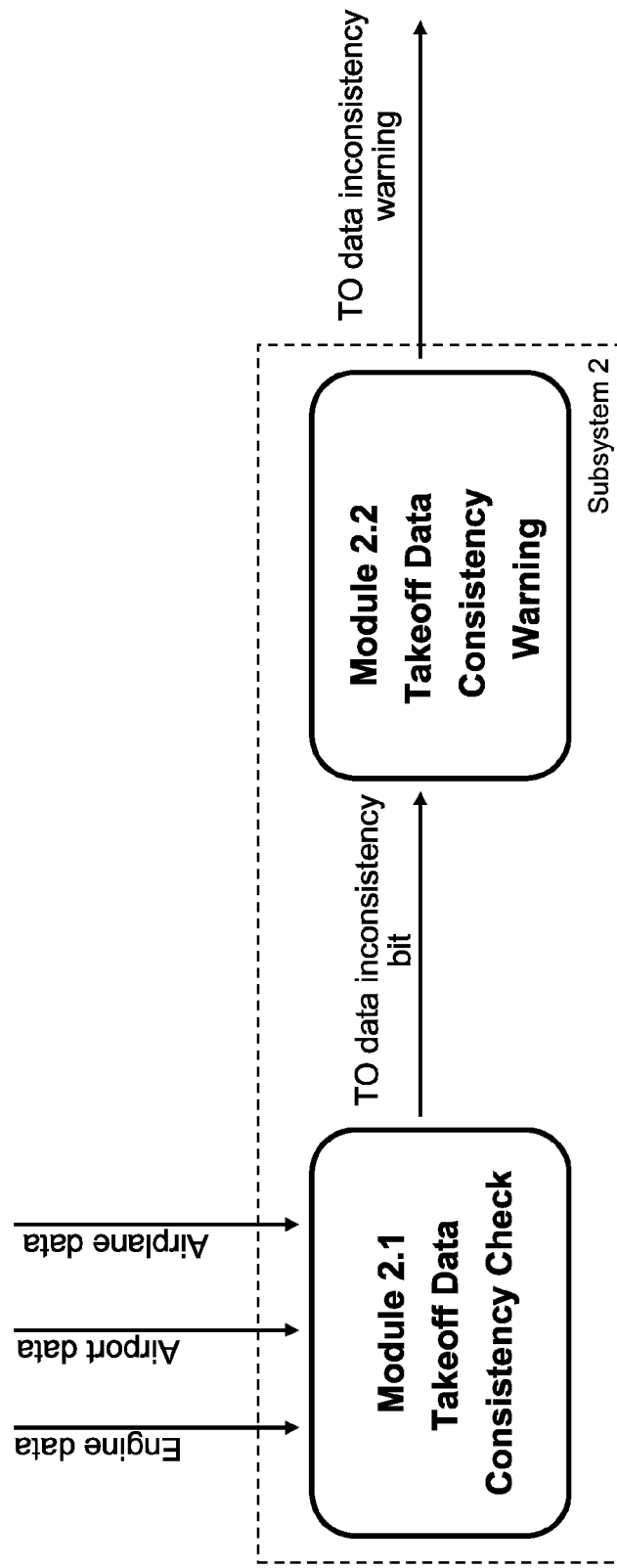
Figure 5 shows the integration between the modules of subsystem 2.

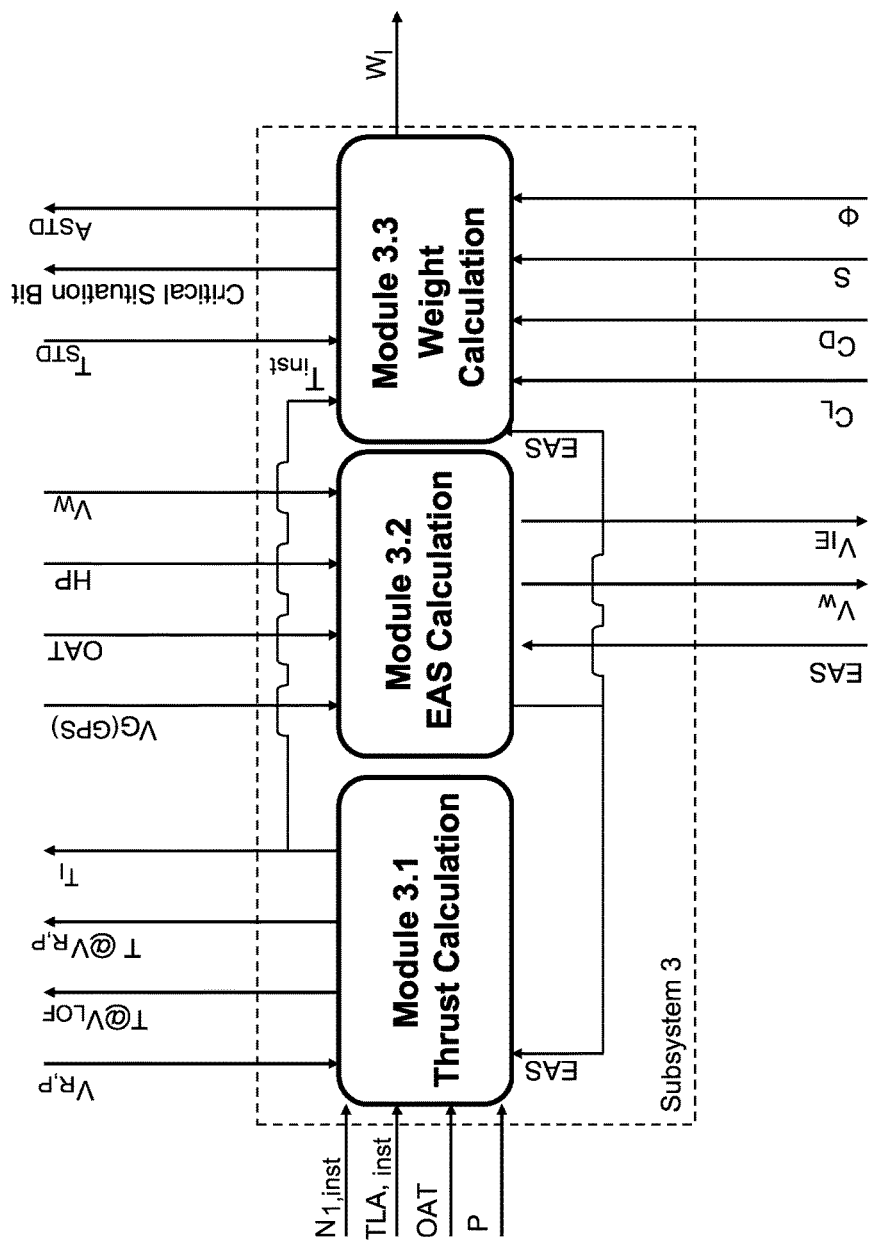
Figure 6 shows the integration between the modules of subsystem 3.

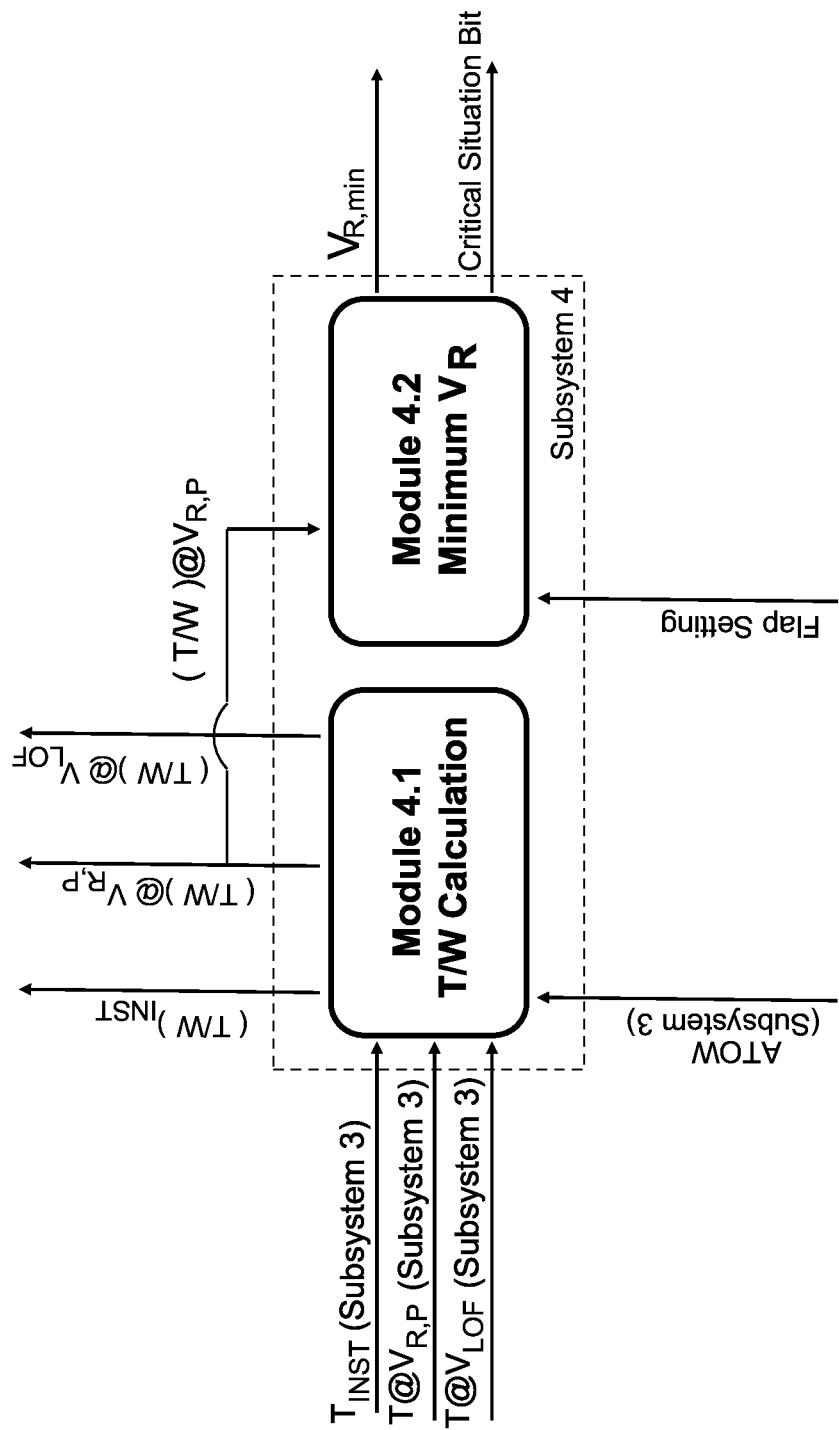
Figure 7 shows the integration between the modules of subsystem 4.

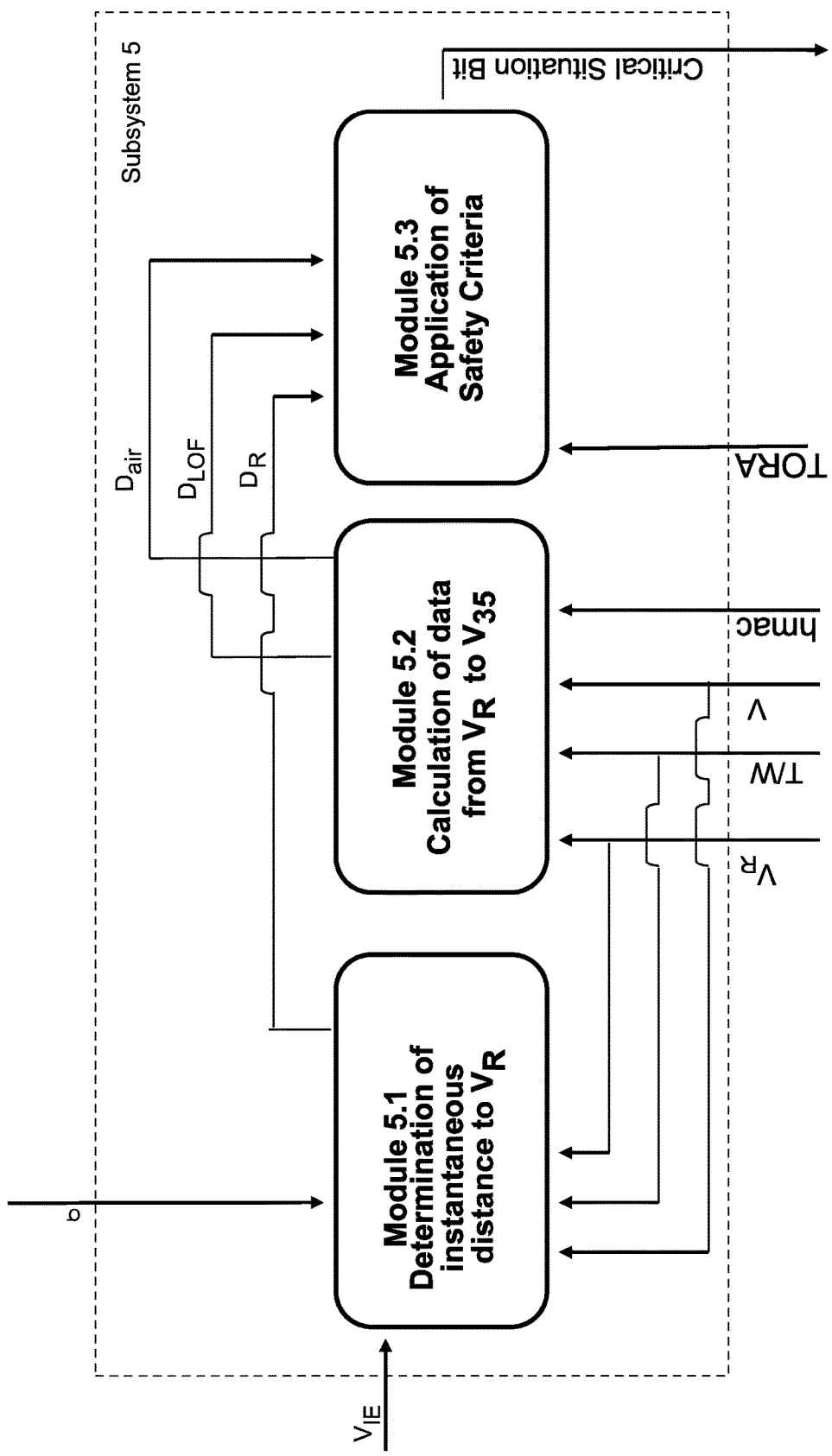
Figure 8 shows the integration between the modules of subsystem 5.

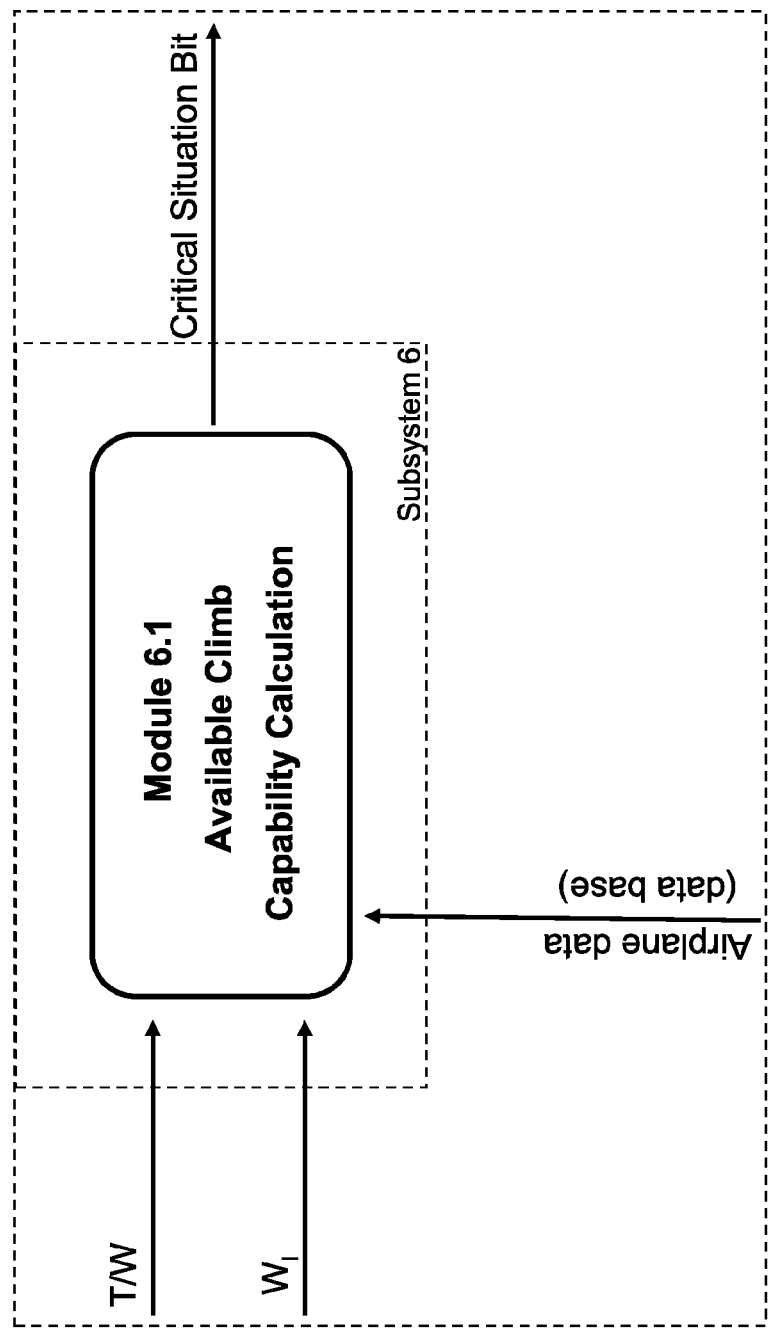
Figure 9 Subsystem 6 module.

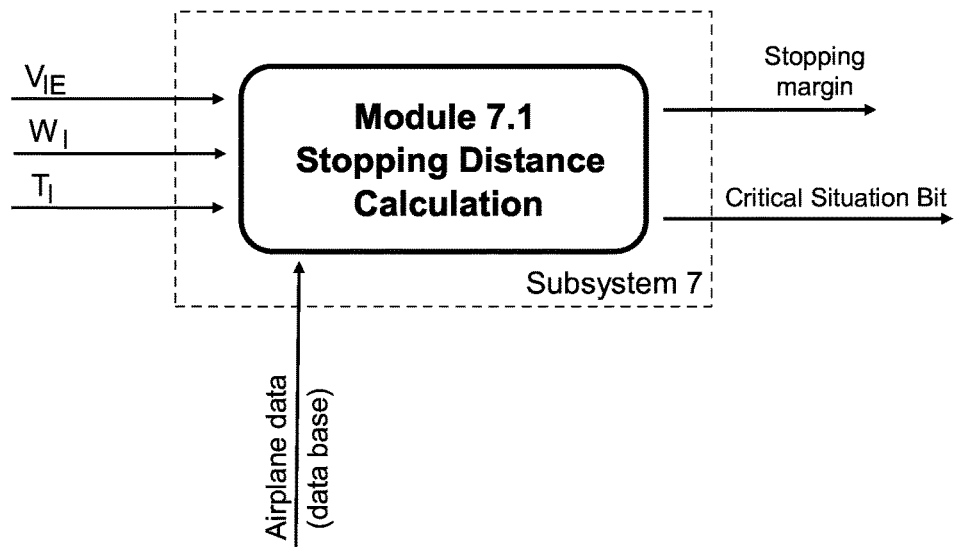
Figure 10 Subsystem 7 module.
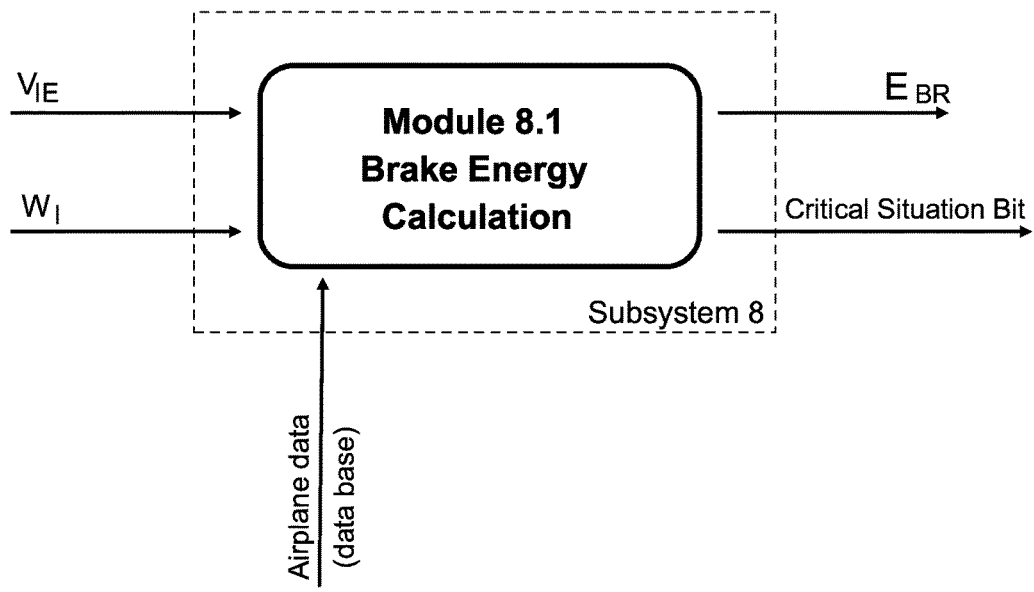
Figure 11 Subsystem 8 module.

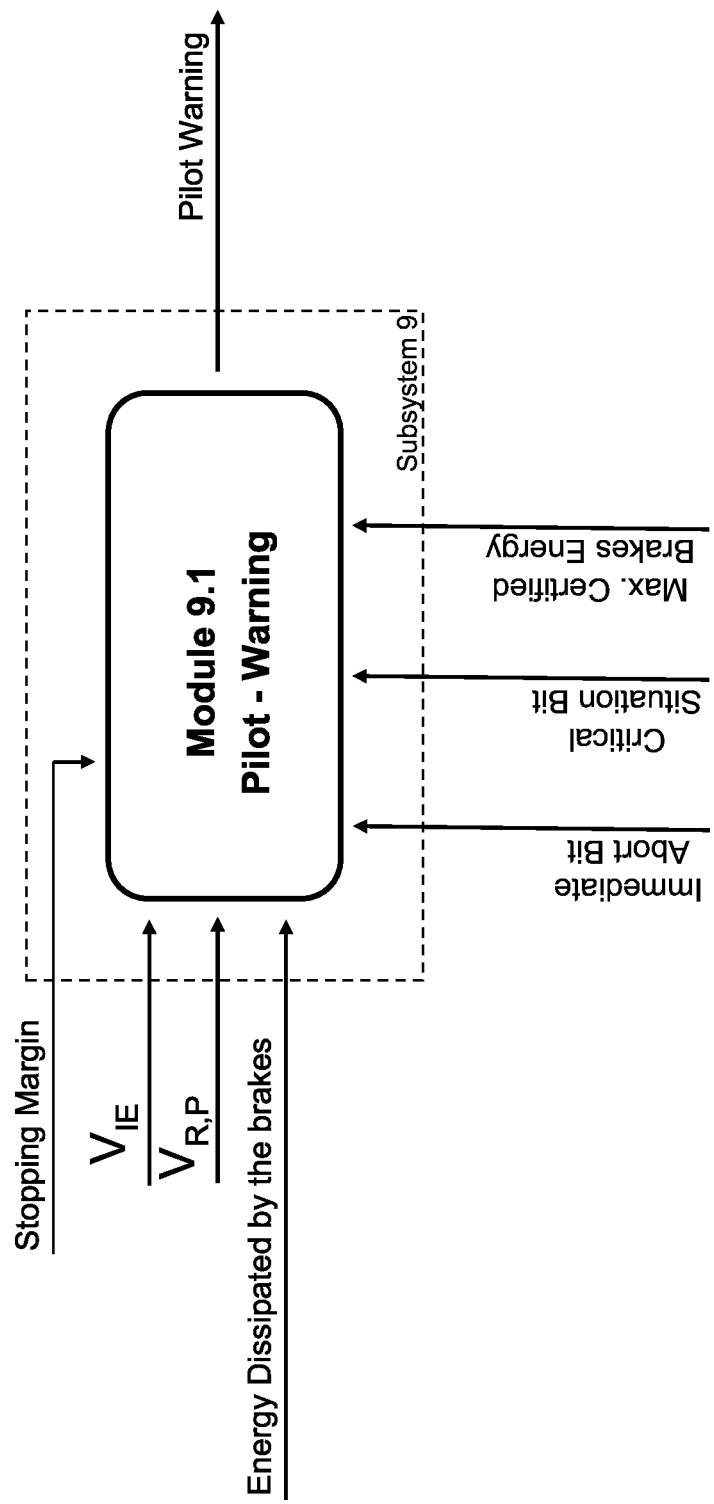
Figure 12 Subsystem 9 module.

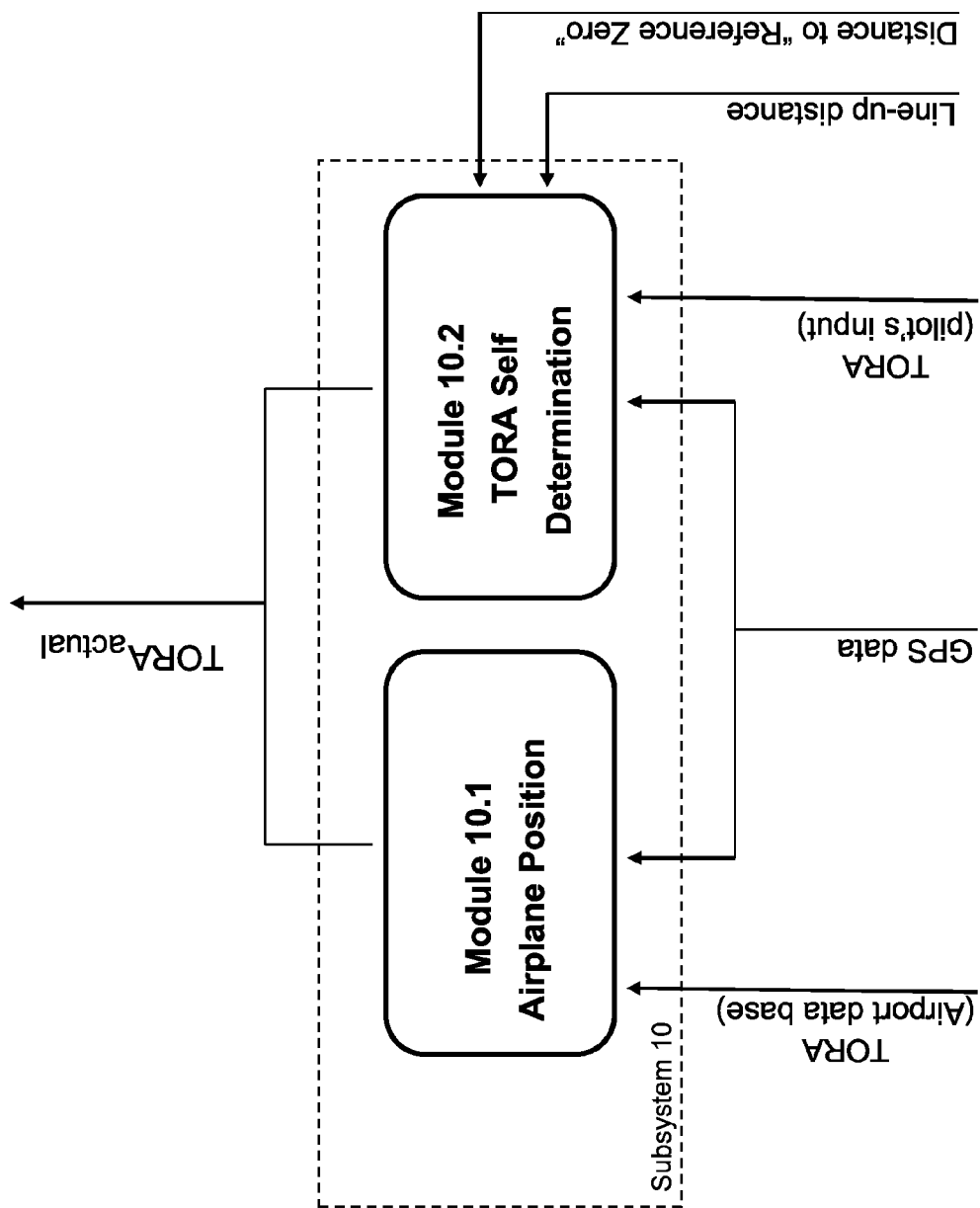
Figure 13 shows the integration between the modules of subsystem 10.

SAFE TAKEOFF MONITORING SYSTEM

CROSS-REFERENCES TO RELATED APPLICATIONS

This application claims priority from provisional application No. 61/579,378 filed Dec. 22, 2011, incorporated herein by reference.

STATEMENT REGARDING FEDERALLY SPONSORED RESEARCH OR DEVELOPMENT

N/A

FIELD

The technology herein is generally related to airplanes and aeronautical engineering, and more particularly to airplane performance and airplane safety. Still more particularly, the technology herein relates to systems and methods that automatically monitor the flight parameters of an airplane during takeoff and provide intervention such as an alert if the takeoff should be aborted.

INTRODUCTION

Jet pilots are trained to make a "go/no-go" decision on every takeoff. The pilots are trained to follow rules formulated to assure that it is possible up to a given point in the takeoff run to stop the airplane in the distance remaining on the runway. After this certain point, it's possible to continue a safe takeoff even in the event of an engine failure.

To fulfill this objective, each takeoff must be carefully planned, calculated, and have relevant parameters matching themselves perfectly.

In the last 40 years in aviation history of transport category airplanes, accidents caused by errors in the preparation of takeoff data and in adjusting the correspondent configuration of the airplane for takeoff have claimed many hundreds of lives. Rejected take-offs (RTOs) are unusual events, and only on the order of one in 1000 RTOs result in accidents. However, such failed RTOs have nevertheless claimed hundreds of lives. Although Transport Category Airplanes are one area of concern, the problems are also applicable to other categories of airplanes such as military and commuter airplanes among others.

One such RTO accident occurred when the pilot rejected the takeoff at 154 knots (2 knots about V1—the takeoff decision speed) when the copilot's side window opened. The airplane overran the runway and crashed into a blast fence, tearing open its left wing and catching on fire.

Another RTO accident occurred because the captain rejected takeoff when the first officer had trouble tracking along a 7000-foot wet runway. The captain rejected takeoff when the airplane was travelling at 5 knots about V1. It turned out that the rudder was trimmed full left prior to takeoff. The airplane was destroyed when it overran the end of the runway and broke apart against piers which extend off the end of the runway into the river.

Yet another RTO accident occurred when the airplane encountered a flock of seagulls at very near V1, when the airplane had already begun to rotate. The number one engine surged and flamed out, and takeoff was rejected. The airplane overran the length of the 6000-foot runway despite a good RTO effort.

Yet another RTO accident occurred when the flight crew noticed onset of vibration at 120 knots. When the vibration (which was due to two failed tires) increased, the pilot elected to reject the takeoff and assume manual control. A few seconds elapsed between the point where vibration was first noted and when the RTO was initiated (just after V1). The airplane reached a speed of 158 knots before it began slowing down. The airplane overran the runway at a speed of 35 knots and finally stopped with its nose in a swamp. The airplane was destroyed.

Those errors may occur in an isolated manner or can be present in a classical chain of events in which one error causes the next. These kinds of errors can be summarized as follows:

a) Incorrect calculation of airplane weight;
b) Incorrect takeoff thrust setting;
c) Incorrect flap setting, both inside or outside of the correct takeoff range;
d) Use of Incorrect takeoff speeds.

More often than not, an RTO accident will involve takeoff speeds in excess of the V1 takeoff decision speed. A takeoff aborted after the airplane is moving fast enough to take off successfully is more likely than lower speed situations to result in an accident because the higher-speed airplane are more likely to overrun their runways. There may not be enough runway remaining to successfully stop the airplane if the RTO is initiated after it has attained V1. As speed approaches V1, successful completion of an RTO becomes increasingly more difficult.

In this context, V1 can be thought of as the maximum speed at which the rejected takeoff maneuver can be initiated and the airplane stopped within the remaining field length under the conditions and procedures defined in the Federal Aviation Regulations. It is the latest point in the takeoff roll where a stop can be initiated. V1 is also the earliest point from which an engine out takeoff can be continued and the airplane attain a height of 35 feet at the end of the runway. See for example Takeoff Safety Training Aid (Aug. 13, 1992), AC No. 120-62, Federal Aviation Administration, incorporated herein by reference.

In the past, others have developed technology in an effort to reduce the risks of errors during takeoffs.

For example, one known approach provides a system and method for automatically alerting the flight crew of an airplane when takeoff is attempted on the wrong runway.

Another approach makes it possible to derive information, a warning or an alarm signal on board an airplane in the event of an anomaly during takeoff. This signal would allow a takeoff interruption in complete safety. However, with such a system, the transition between the moment when an interruption of the takeoff is still possible and the moment when it is no longer possible is very sudden. Because of the critical nature of pilot response time around V1 and the need to plan an RTO before V1 is attained, further improvements are possible.

Some approaches center around creating a "safe stop criterion", which parallels and may conflict with prevailing airworthiness certification requirements. Considering these approaches, there is still room for improvement as, in a broader sense, a system for monitoring the takeoff ought to address both the issues of a safe continuation of the takeoff and its rejection at an early stage, without incurring in any conflict with prevailing airworthiness requirements.

Another known approach derives airplane position and compares it with the intended one. Warnings are issued in case of deviations. At present, several systems to perform those functions are commercially available from different vendors. In order to check takeoff safety, takeoff distance calculation, performed traditionally during flight preparation, can be updated as a function of inserted and calculated parameters. Weight of the airplane without fuel and external ambient temperature are examples of parameters that may be inserted into the flight management system during the flight preparation phase. Weight of fuel on board, air conditioning system status, deicing system status, thrust and aerodynamic configuration of the hyper-lift devices are parameters considered in real time by virtue of transducers in the airplane.

But using such technology, it may not be possible to detect errors made by the pilot while evaluating airplane weight.

An error in airplane weight evaluation can often be a starting point in the chain of events that may eventually lead to catastrophic results or serious damage to the airplane.

An accident scenario which could be avoided would follow a typical (but not unique) sequence of events described by the following steps:
 The pilot misjudges, for the low side, the airplane takeoff weight;
 Based on the wrong weight, the pilot opts for performing a reduced thrust takeoff;
 Based on the low weight and the reduced thrust, wrong (for the low side) takeoff speeds are determined;
 Sometimes, to make things worse, an inadequate flap setting is chosen.

Without appropriate intervention, the typical results of the aforementioned chain of events would be:
 In less critical conditions, an over-rotation with tail contact and tail cone damage;
 In more critical cases:
  Runway overrun, hitting airport installations;
  Collision with obstacles outside airport boundaries;
  Stall;
  Low or no climb capability at all; and,
  In some cases, total loss of airplane with multiple casualties.

To solve these problems, the example illustrative technology herein provides a non-limiting illustrative system to:
 Check the actual physical parameters during takeoff;
 Determine the actual takeoff weight; and
 Warn the pilot to interrupt the takeoff, if any dangerous situation is developing, before a high energy abort is necessary.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 3 shows an example non-limiting interface and integration between system and subsystems.

FIG. 4 shows an example non-limiting integration between the modules of subsystem 1.

FIG. 5 shows an example non-limiting integration between the modules of subsystem 2.

FIG. 6 shows an example non-limiting integration between the modules of subsystem 3.

FIG. 7 shows an example non-limiting integration between the modules of subsystem 4.

FIG. 8 shows an example non-limiting integration between the modules of subsystem 5.

FIG. 9 shows an example non-limiting subsystem 6 module.

FIG. 10 shows an example non-limiting subsystem 7 module.

FIG. 11 shows an example non-limiting subsystem 8 module.

FIG. 12 shows an example non-limiting subsystem 9 module.

FIG. 13 shows an example non-limiting integration between the modules of subsystem 10.

DETAILED DESCRIPTION

Figure 1:
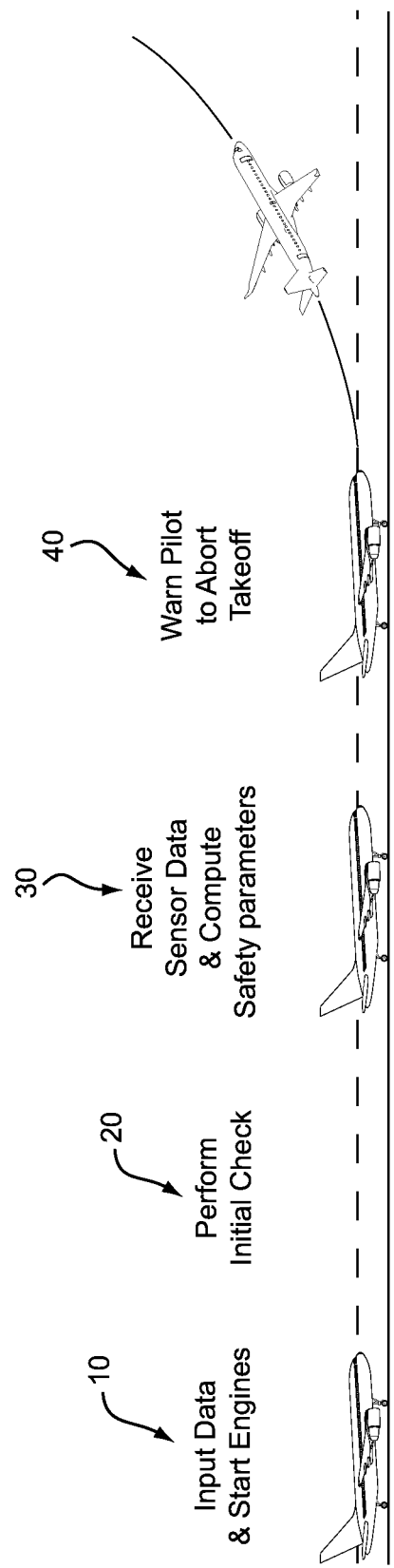
FIG. 1 schematically shows an example non-limiting sequence of operations.

An example non-limiting system performs a series of checks described as follows and shown in FIG. 1.

Before engine start, the pilot or flight crew inputs (10) the following data in the non-limiting example takeoff monitoring system:
 Takeoff data (set of data required operationally to perform a takeoff);
 Takeoff flap setting;
 Runway data (Airport code, RWY designation, TORA, Wind, Temperature, Altitude);
 Thrust setting data (Engine rating, Air conditioning status, ATTCS status, A/I status, etc).

After engine start, an initial check (20) is performed to verify if the takeoff data inputted by the pilot is consistent. In case of inconsistency, a message is shown and/or sounded to warn the pilot. It should be noted that, at this point, only consistency errors are found. If the pilot-input data is coherent, but would lead to an unsafe situation, this would not be found in this particular non-limiting consistency check.

After the beginning of the takeoff roll, the system continuously receives (30) data from various sensors and computes the following elements:
 Airplane actual (instantaneous) weight;
 Minimum acceptable Rotation Speed;
 Distances required to attain Rotation, Lift-Off and 35 ft-height above the runway, considering an all-engine-operating condition;
 Evaluate the energy absorbed by the brakes in case of a refused takeoff;
 Distance required for stopping the airplane from the present position;
 Evaluate the climb gradient available at lift-off, considering an all-engine-operating condition.

The system warns the pilot (40) in a very timely fashion to abort the takeoff if at least one of the following conditions occurs:
 A large deviation is detected between the airplane weight as determined by the system and the one inserted by the pilot;
 Rotation Speed proposed by the pilot is lower than the minimum acceptable, for the actual airplane condition;
 The distance available on the runway would not assure a safe takeoff;
 The climb capability after lift-off is inadequate.

In one example non-limiting implementation, this warning is issued in the following scenarios:
 The distance to stop the airplane on the remaining runway is adequate;
 The airplane energy is within the brakes absorption capability;
 The actual airplane speed is below $V_R$.
 Such conditions on the warning in the example non-limiting system serve to prevent failed rejected takeoffs.

Description of Non-Limiting Preferred Embodiment

Figure 2:
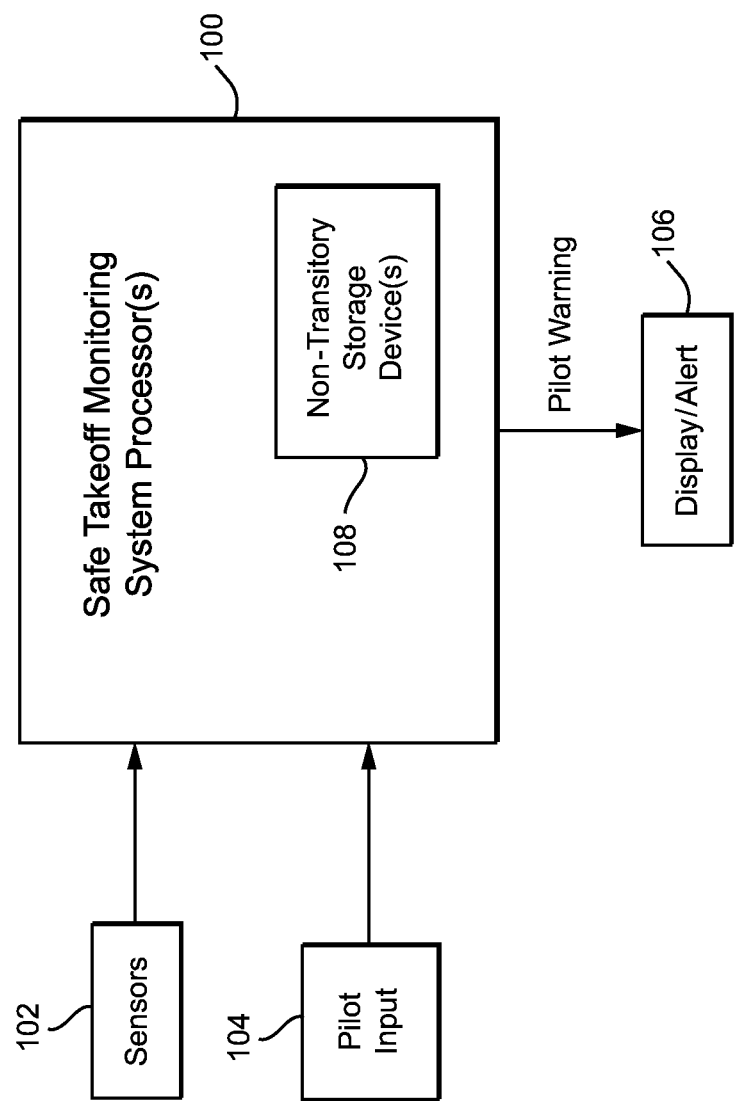
FIG. 2 shows an example non-limiting overall system.

A non-limiting example preferred embodiment system and subsystem integration is shown in FIG. 2.

As shown in FIG. 2, sensors 102 onboard the airplane as well as pilot input 104 are provided to a Safe Takeoff Monitoring System 100 having one or more computer processors. Safe Takeoff Monitoring System 100 processors execute a software program under control of software instructions stored in one or more non-transitory storage devices 108 to analyze the inputs provided by sensors 102 and the pilot input 104. As described above, such continual analysis during the period when the airplane is rolling down the runway can be used to warn the pilot via a display/alert 106 to abort takeoff under certain circumstances.

FIG. 3 shows a more detailed view of Safe Takeoff Monitoring System 100. As can be seen in FIG. 3, system 100 may comprise a number of different subsystems 1-10 that are interconnected to function and operate together as an integrated whole. In one non-limiting example:

subsystem 1 may comprise a pilot-system interface module and an airplane basic data module shown in more detail in FIG. 4, subsystem 2 may comprise a takeoff data consistency check module and a takeoff data consistency warning module shown in more detail in FIG. 5, subsystem 3 may comprise a thrust calculation, EAS calculation and weight calculation set of modules shown in more detail in FIG. 6, subsystem 4 may comprise a T/W calculation monitor and a minimum $V_R$ module shown in more detail in FIG. 7, subsystem 5 may comprise a module to determine instantaneous distance to $V_R$, a module to calculate data from $V_R$ to $V_{35}$, and a module to apply one or more safety criteria shown in more detail in FIG. 8, subsystem 6 may comprise an available climb capability calculation module shown in more detail in FIG. 9, subsystem 7 may comprise a stopping distance calculation module shown in more detail in FIG. 10, subsystem 8 may comprise a brake energy calculation module shown in more detail in Richards 11, subsystem 9 may comprise a pilot warning module shown in more detail in FIG. 12, and subsystem 10 may comprise an airplane position module and a TORA self-determination module shown in more detail in FIG. 13.

While the figures described above show each one of these various subsystems as separate blocks interconnected by signal lines, the actual exemplary non-limiting implementation can be in any of a variety of manners including for example one or a plurality of hardware and/or software modules interconnected in any of a number of different ways. For example, one possible implementation could use a different hardware and/or software-controlled module for each of the subsystems and/or functional portions thereof. Another exemplary non-limiting implementation might implement one or more subsystem functions in software executing on a common processor or processors. Processing can be centralized or distributed, or any combination. Some functions may be implemented in hardware while other functions are implemented in software, or all functions could be implemented in hardware, or all functions can be implemented in software. The particular implementation used may depend on the application, the availability of computing resources that are already in place and used for other purposes, fault tolerance considerations, reliability considerations and other aspects well known to those skilled in the art. For example, in one example non-limiting implementation, the subsystems can comprise software modules executing on a single processor signaling to one another through stored values and interrupts or distributed among different cores of a multicore processing system signaling to one another via shared memory and other well-known mechanisms. Alternatively the subsystems can comprise different computers or processors communicating together. In other non-limiting implementations, some subsystems can include special purpose hardware such as programmed gate arrays or other logic to execute particular functions. The optimal division between hardware and software for a particular implementation is left to the system designer as is well understood by those skilled in the art.

Subsystem 1—Interface between Pilot and Airplane

In one example implementation, subsystem 1 consists of two modules described as follows and shown in FIG. 4.

Module 1.1—Pilot-airplane Interface (Pilot Interface Means)

It is typically constituted by elements (like a MCDU and FMS) capable of receiving and storing the following data inputted by the pilot:

Takeoff weight proposed by the pilot;
Takeoff speeds proposed by the pilot (for a Transport Category Airplane they would be defined by 14 CFR 25; for a Military Airplane will be defined in MIL-STD-3013);
Airport Identification Code;
Identification of runway of intended departure;
Slope of runway of intended departure;
Distance lost due to alignment on runway of intended departure; (*)
Length of the runway intended for departure; (*)
Wind at the airport;
Pressure Altitude at the airport;
Temperature at the airport;
Flap setting intended for takeoff;
Engine takeoff rating and related information (Bleed, ATTCS, etc).
(*) In one example implementation, this data need be introduced only when module 10.2 is activated.

Module 1.2—All-flight Data-storage (Airplane Basic Data Storing Means)

This system stores the following data:
Maximum structural takeoff weight;
Basic operating weight;
Maximum certified brake energy.

Subsystem 2—Takeoff Data Consistency Check

In one example implementation, subsystem 2 consists of two modules described as follows. An overview of Subsystem 2 and the integration and interface between modules is shown in FIG. 5.

Module 2.1—Takeoff-data Check (Takeoff Data Consistency Checking Means)

This module receives data from the engines, and from Subsystem 1 (airplane and airport data). The module starts its check routine once the data received from engines indicate that the first engine is already running.

a) First Check

In the module's database, tables of takeoff speeds are stored. Those tables present the speeds as functions of:
Airplane weight;
Airport temperature;
Airport pressure altitude;
Runway slope;
Takeoff flap setting;
Takeoff thrust rating code and associated conditions.

The module checks if the values of takeoff speeds inserted by pilot are within valid limits. If a lack of consistency is found, an inconsistency bit is send to the Takeoff-data Consistency Warning module.

b) Second Check

The module checks whether the correct relationships between speeds are met, for example, for a Transport Category Airplane (see notations below):

$$V_R \geq V_1;$$

$$V_2 \geq V_R;$$

$$V_{FTO} \geq V_2;$$

The module also checks if the proposed takeoff weight is within an acceptable range:

Basic operating weight (BOW)≤Takeoff weight proposed by the pilot≤Maximum structural takeoff weight (MTOW).

If one of the relationships is not met, an Inconsistency Bit (IB) is sent to Module 2.2 to issue a takeoff-data consistency warning.

It is important to note that in one example non-limiting embodiment, those two checks only find errors of consistency. If the pilot-input values are coherent, the example non-limiting implementation does not at this stage try to determine or verify if they are the proper values.

Module 2.2—Takeoff-data Consistency Warning (Takeoff Data Consistency Warning Means)

This module issues to the pilot a message of "takeoff data inconsistency" if an inconsistency bit was received from module 2.1. The aim is to issue this warning as soon as possible in order to allow the pilot to correct the data entry immediately, avoiding departure delays.

Subsystem 3—Actual Takeoff Weight Evaluation System

Subsystem 3 consists of three modules in the example non-limiting implementation. An overview of Subsystem 3 and the integration and interface between modules is shown in FIG. 6.

Module 3.1—Thrust Calculation (Thrust Calculating Means)

This module receives the following data input from airplane systems:

Instantaneous $N_1$ and throttle position from each engine FADEC;
Temperature;
Pressure Altitude;
EAS from Module 3.2;
Rotation speed inserted by the pilot ($V_{R,P}$) from Subsystem 1.

This module initializes the operation of Subsystems 4, 5, 6, 7, 8, 9 and 10, according to a throttle position (TLA) consistent with a takeoff intention.

Module 3.1 presents the following outputs:

$T_{inst}$ (total engine thrust at the instantaneous equivalent airspeed $V_{IE}$);

$T@V_{R,P}$ (total engine thrust at the pilot-inserted Rotation speed);

$T@V_{LOF}$ (total engine thrust at estimated Lift-off Speed, which is the sum of $V_{R,P}$ and the speed increment between Rotation and Lift-off).

Module 3.2—Equivalent Airspeed (EAS) Calculation (Equivalent Air Speed Calculating Means)

This module determines the equivalent airspeed and wind.

It works in two phases:

a) 1$^{st}$ Phase: Low Speed.

Low Speed phase is defined as a phase where the airplane's anemometric system is not alive yet (i.e. it does not present readable and/or reliable speed indications). Module 3.2 calculates $V^{IE}$ from the following data:

Ground speed (from GPS);
Temperature (from airplane systems);
Altitude (from airplane systems);
Wind speed (from Subsystem 1).

b) 2nd Phase: Anemometric System Alive

The module presents the equivalent airspeed (EAS) obtained from airplane systems and calculates wind speed at ground level height (wind at $h_{MAC}$) from the following data:

Ground speed (from GPS);
Temperature (from airplane systems);
Altitude (from airplane systems);
Equivalent Airspeed—EAS (from airplane systems).

Module 3.3—Weight Determination (Weight Calculating Means)

In this module, a standard acceleration equation is stored for each flap setting. This standard acceleration is used to determine the instantaneous airplane weight ($W_I$).

Module 3.3 calculates the actual airplane weight from the following data:

Instantaneous Thrust from Thrust Module 3.1;
$V_{IE}$ from module 3.2;
Longitudinal acceleration from onboard accelerometers;
Runway slope from Subsystem 1.

This data is inserted on the applicable standard acceleration equation (i.e. applicable to the actual flap position), continuously deriving airplane weight ($W_I$).

The weight evaluation is performed by taking into account the actual flap position set during the takeoff, regardless of whether it was the one planned to be used by the pilot or not.

If the actual flap setting informed by airplane systems does not match any of the standard acceleration equations stored in this module, or if the airplane system does not send any valid flap position information, an Immediate Abort Bit (IAB) is sent to Subsystem 9.

At the beginning of the takeoff roll, several events like rolling takeoffs, turns to align the airplane in the runway, use of brakes, etc., gives accelerometer readings which may mask and interfere with the weight calculation output. Normally two or three seconds of calculations are then necessary in one non-limiting implementation to stabilize the weight values output.

The first instant when stable takeoff weights are obtained is considered the "Reference Zero".

The determination of a relevant difference between the calculated takeoff weight and that proposed by the pilot is the first sign of something wrong in the takeoff planning.

The following Safety Criteria are thus defined:

If (Instantaneous Weight/Maximum structural takeoff weight)≥$K_1$, a Critical Situation Bit (CSB) is generated;

If (Instantaneous Weight/Takeoff weight proposed by the pilot)≥$K_2$, a Critical Situation Bit (CSB) is generated $K_1$ and $K_2$ are values to be adjusted to each airplane model/type in the example non-limiting embodiment.

Subsystem 4—Minimum Rotation Speed Verification System

Subsystem 4 consists of two modules in the example non-limiting implementation. An overview of Subsystem 4 and the integration and interface between its modules is shown in FIG. 7.

Module 4.1—T/W Calculation (Total Thrust/weight Ratio Calculating Means)

This module receives Total Thrust from module 3.1 and Weight from module 3.3, calculating T/W in the following conditions:
At the instantaneous speed;
At pilot-inserted $V_R$ ($V_{R,P}$);
At the estimated Lift-Off Speed ($V_{R,P}$+speed increment between Rotation and Lift-Off).

Module 4.2—Calculation of Minimum Rotation Speed (Minimum $V_R$ Calculating Means)

In this module, tables of minimum $V_R$ as a function of flap setting and T/W at Rotation are stored.

This module calculates the minimum acceptable $V_R$ ($V_{R,min}$) based on the following data:
Actual takeoff flap setting (from airplane systems);
TAN calculated at $V_{R,P}$ (from module 4.1).
$V_{R,min}$ is defined as the operationally defined $V_R$ less 5 kt.
The following Safety Criterion is thus defined:
If $V_{R,P} < V_{R,min}$, a Critical Situation Bit (CSB) is generated.

Subsystem 5—Distances' Determination

Subsystem 5 consists of three modules in the example non-limiting implementation. An overview of Subsystem 5 and the integration and interface between its modules is shown in FIG. 8.

Module 5.1—Instantaneous Distance to $V_R$ Determination (Instantaneous Distance to $V_R$ Calculating Means)

Initially, $V_{RMS}$ is calculated as follows. $V_{RMS}$ is the mean square root speed between instantaneous speed $V_{IE}$ and $V_{R,P}$ (pilot-inserted $V_R$):

$$V_{RMS}=[(V_{IE}^2-V_{R,P}^2)/2]^{0.5} \qquad \text{(eq. 1)}$$

where $V_{RMS}$, $V_{IE}$ and $V_{R,P}$ are considered in terms of equivalent airspeed (EAS).

The calculated $V_{RMS}$ value is used in the applicable (for the actual takeoff flap position) standard acceleration equation to obtain the standard acceleration and then derive the physical acceleration.

$D_1$, the instantaneous distance from $V_I$ to $V_R$, is calculated through eq. 2:

$$D_1=\{[(V_{RE}^2-V_{IE}^2)/\sigma]+[(2 \cdot V_W/\sigma^{0.5}) \cdot (V_{IE}-V_{RE})]\}/(2 \cdot A) \qquad \text{(eq. 2)}$$

where:
A is the physical acceleration;
$V_{RE}$ is $V_R$ in terms of equivalent airspeed (EAS);
$V_{IE}$ is the instantaneous speed in terms of equivalent airspeed (EAS);
$V_W$ is the wind speed;
σ is the air density ratio.

This distance is added to $D_2$, the distance from Reference Zero to the instantaneous position on runway, to obtain the total distance from Reference Zero to $V_{RE}$, as shown in eq. 3:

$$D_R=D_1+D_2 \qquad \text{(eq. 3)}$$

$D_2$ can be obtained directly from the GPS system.

Module 5.2—Calculation of Data from $V_R$ to 35 ft above the ground (Means for Calculating Data from $V_R$ to $V_{35}$)

In one non-limiting example embodiment, this module has an internal tabulation of the data listed below as a function of T/W at $V_R$ and flap position.

Speed increment between rotation and lift-off
Speed increment between lift-off and 35 ft
Time between rotation and lift-off
Time between lift-off and 35 ft With data from these tables, calculation of speed at lift-off and at 35 ft above the ground, in terms of equivalent airspeed (EAS), is performed.

Those speeds are converted to ground speed considering air density and wind speed.

The wind speed considered for 35 ft should in one non-limiting implementation take into account the airplane height above the runway. This is done in one example implementation by converting the wind speed at $h_{MAC}$ previously calculated (wind speed at ground level) using eq. 4:

$$V_{W35} = V_W \cdot \left(\frac{h_{MAC}+10.67}{h_{MAC}}\right)^{0.143} \qquad \text{(eq. 4)}$$

Module 5.3—Application of the Safety Criteria on Takeoff Distances

The following safety criteria are considered and checked:
If $(D_R+D_{LOF}+D_{AIR}) \leq \text{TORA} \rightarrow$ a safe situation exists;
If $(D_R+D_{LOF}+D_{AIR}) \geq \text{TORA} \rightarrow$ a second check should be performed:
If $[D_R+D_{LOF}+(D_{AIR}/2)] \leq \text{TORA} \rightarrow$ a safe situation exists;
If $[D_R+D_{LOF}+(D_{AIR}/2)] \geq \text{TORA} \rightarrow$ a Critical Situation Bit (CSB) is generated.

where TORA is the distance from "Reference Zero" to the last point of usable runway ahead of the airplane, on the runway actually being used for takeoff, as informed by Subsystem 10.

Subsystem 6—Available Climb Capability

In one non-limiting implementation, subsystem 6 consists of a single module described as follows and shown in FIG. 9.

Module 6.1—Climb Capability Determination (Available Climb Capability Calculating Means)

This module calculates the expected climb gradient at lift-off using eq. 5:

$$\gamma_{LOF}=(T/W)-(C_D/C_L) \qquad \text{(eq. 5)}$$

where:
T/W is calculated for the available thrust at the expected lift-off speed obtained from module 3.1;
$W_I$ is the instantaneous weight obtained from the module 3.3;
$C_L$ is the applicable lift coefficient for the instantaneous weight at the calculated lift-off speed;
$C_D$ is the drag coefficient obtained from drag polar for the actual takeoff flap position as informed by airplane systems and the above mentioned $C_L$ The system in one example non-limiting embodiment does not take credit of ground effect.

The following safety criterion is considered and checked:
If $\gamma_{LOF} < K_4$, then a critical situation bit is generated.
$K_4$ is a value to be adjusted to suit each airplane model/type.

Subsystem 7—Distance Required for Stopping

Subsystem 7 consists of a single module described as follows and shown in FIG. 10.

Module 7.1—Stopping Distance Calculator (Stopping Distance Calculating Means)

This module continuously calculates the distance required to stop considering an all-engine-operating stop, started at the present speed for the actual conditions and the weight obtained in Module 3.3.

This distance is calculated using a criterion coherent with the Certification Basis of the airplane.

Additionally, a stopping margin is continuously calculated and establishes one of the limits to issue an abort warning (see Subsystem 9). The stopping margin is calculated using eq. 6:

$$\text{Stopping margin} = \left[ \left( \frac{\text{distance from present position to end of } TORA}{\text{distance to stop from present position}} \right) - 1 \right] \quad \text{(eq. 6)}$$

Subsystem 8—Brake Energy System

In a non-limiting example embodiment, subsystem 8 consists of a single module described as follows and shown in FIG. 11.

Module 8.1—Energy Dissipated by Brakes (Brake Energy Calculating Means)

This module continuously calculates the energy dissipated by the brakes considering a stop started at the current speed, for the prevailing conditions and the weight obtained from Module 3.3.

For the same reasons presented in Subsystem 7, this energy is calculated using a criterion coherent with the Certification Basis of each airplane model/type and so need not be detailed here.

Subsystem 9—Pilot-warning System

Subsystem 9 consists of a single module described as follows and shown in FIG. 12 in one non-limiting implementation.

Module 9.1—Pilot Warning (Pilot Warning Calculating Means)

This subsystem is responsible for issuing a warning to the pilot to abort the takeoff.

A warning is issued to the pilot if an Immediate Abort Bit (IAB) is received or if the following conditions occur concurrently:

Instantaneous Speed<$V_R$ proposed by the pilot;
Stopping Margin>$K_5$, where $K_5$ is a value to be adjusted to each airplane model/type;
Energy dissipated by the brakes<Maximum certified brakes energy (from Subsystem 1);
A Critical Situation Bit (CSB) is received.

Subsystem 10—TORA Calculation

Subsystem 10 consists of two modules in the example non-limiting implementation. An overview of Subsystem 10 and the integration and interface between its modules is shown in FIG. 13.

Module 10.1—Airplane Position in the Airport

There are several GPS-based, commercially-available (COTS) systems capable of presenting the airplane position in the airport and providing information on the takeoff run available.

The example non-limiting technology herein could be configured to work with any of these systems, so this conventional module need not be detailed any further here.

Module 10.2—TORA Self Determination (TORA Determining Means)

This module takes over the function of informing airplane position in the airport and on the runway when the COTS system is unable to provide this information. This kind of situation is likely to occur when:

The current airport is not included in the airport database;
The chosen runway is undergoing maintenance works and the data in the database is temporarily not applicable.

This module considers the TORA according to the criterion set forth in eq. 7:

$$A = B - (C + D) \quad \text{(eq. 7)}$$

where:
A is the takeoff run available ahead of the "Reference Zero";
B is the length of runway intended for departure;
C is the distance lost due to alignment on runway intended for departure;
D is the distance from initialization of systems operation to "Reference Zero".

Nature of Warnings

Takeoff Data Inconsistency

This warning is issued as an EICAS message, just after the start of the first engine, with the airplane still on the ramp.

This warning does not convey the idea of urgency, i.e. imminent danger. It does, however, indicate that the pilot shall correct any data input mistake in order to avoid further delays in the takeoff.

Errors Requiring a Takeoff Abort

The warnings associated to these errors demand an immediate pilot action in order to stop the airplane on the remaining runway.

For this purpose an aural warning is used and, optionally, a cockpit multifunction display (MFD) presentation showing an airport plan view, with markers at the 35 ft height point and at the full stop point. In one example non-limiting implementation, the 35 ft-point mark stays essentially fixed and the complete-stop-point mark moves along the runway as airplane moves and speed increases.

By essentially fixed, it is meant that small position fluctuations are normal and expected due to:

The calculation loop itself;
Changes in wind;
Changes in runway slope;
Changes in rolling friction.

Additionally, pilot's actions, like, for example, a sudden thrust reduction, is reflected in the results.

Example Notation Used Above

A Acceleration, Takeoff Run Available ahead of Reference Zero
A/C Airplane
A/I Anti Ice System
$A_{STD}$ Standard Acceleration
ATOW Actual Takeoff Weight
ATTCS Automatic Takeoff Thrust Control System
B Length of runway intended for departure
BOW Basic Operating Weight
C Distance lost to alignment on runway intended for departure
$C_D$ Airplane Drag Coefficient
CFR Code of Federal Regulations (United States)
$C_L$ Airplane Lift Coefficient
COTS Commercial, off-the-shelf System
CSB Critical Situation Bit
D Distance from initialization of systems operation to Reference Zero
$D_{AIR}$ Air Distance $D_{LOF}$ Distance from Rotation Speed to Lift-off Speed
$D_R$ Distance from Reference Zero to Rotation Speed
$D_1$ Instantaneous distance from $V_I$ to $V_R$
$D_2$ Distance from Reference Zero to the instantaneous position on the runway
EAS Equivalent Airspeed
$E_{BR}$ Energy dissipated in the brakes
$E_{BR,MAX,CER}$ Maximum Certified Braking Energy
EICAS Engine Information and Crew Alerting System
FADEC Full-Authority Digital Engine Control
FMS Flight Management System
GPS Global Positioning System
$h_{MAC}$ Height of the Mean Aerodynamic Chord
$H_P$ Pressure Altitude
IAB Immediate Abort Bit
IB Inconsistency Bit
ICAO International Civil Aviation Organization
$K_1, K_2, K_4, K_5$ Numerical Constants
MAC Mean Aerodynamic Chord
MCDU Multi-function Control Display Unit
MFD Multi-function Display
MIL-STD Military Standard (United States)
MTOW Maximum Takeoff Weight (Structural)
$N_1$ Engine Fan speed
$N_{1,P}$ Instantaneous Engine Fan speed
OAT Outside Air Temperature
$OAT_P$ Outside Air Temperature as inserted by the pilot in the FMS
RWY Runway
RWY ID Runway Identification
S Wing reference area
STOMS Safe Takeoff Monitoring System
T Total Thrust (All Engines Operating)
$T_{inst}$ Total Instantaneous Thrust (All Engines Operating)
$T_{STD}$ Standard Thrust
$T@V_{R,P}$ Total Thrust at $V_{R,P}$
$T@V_{LOF}$ Total Thrust at $V_{LOF}$
T/W Thrust-to-weight ratio
$(T/W)_{LOF}$ Thrust-to-weight ratio at Lift-off
TLA Thrust Lever Angle
$TLA_{inst}$ Instantaneous Thrust Lever Angle
TO Takeoff
TORA Takeoff Run Available
$V_G$ Ground Speed
$V_R$ Takeoff Rotation Speed
$V_{RE}$ Takeoff Rotation Speed in terms of Equivalent Airspeed
$V_{RMS}$ Average Speed (Mean Square Root)
$V_{R,min}$ Minimum Takeoff Rotation Speed
$V_{R,p}$ Takeoff Rotation Speed as inserted by the pilot in the FMS
$V_{LOF}$ Lift-off Speed
$V_I$ Instantaneous Airspeed
$V_{IE}$ Instantaneous Equivalent Airspeed
$V_{FTO}$ Final Takeoff Speed
$V_{FTO,P}$ Final Takeoff Speed as inserted by the pilot in the FMS
$V_1$ Takeoff Decision Speed
$V_{1,P}$ Takeoff Decision Speed as inserted by the pilot in the FMS
$V_2$ Takeoff Safety Speed
$V_{2,P}$ Takeoff Safety Speed as inserted by the pilot in the FMS
$V_{35}$ Airspeed at 35 ft above the runway, in an all engines operating takeoff
$V_W$ Wind Speed
$V_{W35}$ Wind Speed at 35 ft above the runway
W Airplane Weight
$W_I$ Airplane Instantaneous Weight
$\gamma_{LOF}$ Climb gradient at Lift-off
$\sigma$ Air Density Ratio
$\phi$ Runway slope While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. A safe takeoff monitoring system for an airplane including brakes, the system comprising:
  sensors onboard the airplane that detect parameters relating to airplane weight and detect parameters relating to the actual speed of the airplane; and
  an automatic processor operatively coupled to the sensors and responsive to pilot input data including takeoff data, takeoff flap setting, runway data and thrust setting data,
  the automatic processor after the beginning of takeoff roll of the aircraft continually receiving data from the sensors and computing in response to the received data at least airplane actual instantaneous weight, minimum acceptable rotation speed, and distances required to attain rotation, lift-off and 35 ft-height above the runway, considering an all-engine-operating condition;
  the automatic processor after the beginning of the takeoff roll continually evaluating the energy absorbed by the brakes in case of a refused takeoff, determining distance required for stopping the airplane from the present position, and evaluating a climb gradient available at lift-off, considering an all-engine-operating condition;
  the automatic processor warning the pilot to abort the takeoff if at least one of the following conditions occurs:
    a large deviation is detected between airplane weight as computed by the automatic processor and aircraft weight pilot input data,
    rotation speed pilot input data is lower than the minimum acceptable, for the actual airplane condition,
    the distance available on the runway would not assure a safe takeoff, or
    the climb capability after lift-off is inadequate;
  upon determining one of the conditions occurs, the automatic processor further issuing the warning to the pilot to abort takeoff if (a) the distance to stop the airplane on the remaining runway is adequate, (b) the airplane energy is within the absorption capability of the brakes, and (c) the actual airplane speed is below VR,
  the automatic processor, determines the distance available on the runway would not assure a safe takeoff, by determining whether the remaining distance on the runway from the present position of the airplane on the runway is sufficient, based on current aircraft speed and brake absorption capability, for the airplane to stop on the runway.

2. The system of claim 1 wherein said automatic processor computes airplane actual instantaneous weight in response to the sensors.

3. The system of claim 1 wherein the automatic processor computes minimum acceptable rotation speed $V_R$ and also determines the airplane's equivalent airspeed once anemometric inputs are available and uses the equivalent airspeed as the actual airspeed.

4. The system of claim 1 wherein the automatic processor evaluates the climb gradient available at lift-off, considering an all-engine-operating condition.

5. The system of claim 1 wherein the automatic processor warns the pilot to abort takeoff if pilot inputted rotation speed $V_{R,P}$ is lower than the minimum rotation speed $V_R$ acceptable for actual airplane operating conditions.

6. The system of claim 1 wherein the automatic processor calculates stopping distance.

7. The system of claim 1 wherein the automatic processor determines a thrust to weight ratio.

8. The system of claim 1 wherein the automatic processor considers and checks the following safety criteria:
If (DR+DLOF+DAIR)≤TORA, a safe situation exists;
If (DR+DLOF+DAIR)≥TORA, a second check is performed comprising:
  If [DR+DLOF+(DAIR/2)]≤TORA, a safe situation exists; and
  If [DR+DLOF+(DAIR/2)]≥TORA, a Critical Situation Bit (CSB) is generated,
where DR is distance from reference zero to rotation speed, DLOF is distance from rotation speed to lift-off speed, DAIR is air distance, and TORA is the distance from reference zero to the last point of usable runway ahead of the airplane, on the runway actually being used for takeoff.

9. The system of claim 1 wherein the automatic processor calculates $V_{RMS}$ where $V_{RMS}$ is the mean square root speed between instantaneous speed $V_{IE}$ and pilot-inputted rotation speed $V_{R,P}$:

$$V_{RMS}=[(V_{IE}^2-V_{R,P}^2)/2]^{0.5}$$

where $V_{RMS}$, $V_{IE}$ and $V_{R,P}$ are considered in terms of equivalent airspeed (EAS); and
wherein the automatic processor uses the calculated $V_{RMS}$ value is used in an acceleration determination that takes into account actual takeoff flap position to obtain the acceleration and then derive the physical acceleration A;
the automatic processor calculating $D_1$, the instantaneous distance from $V_I$ to $V_R$, through:

$$D_1=\{[(V_{RE}^2-V_{IE}^2)/\sigma]+\lfloor(2\cdot V_W/\sigma^{0.5})\cdot(V_{IE}-V_{RE})\rfloor\}/(2\cdot A)$$

where A is the physical acceleration, $V_{RE}$ is $V_R$ in terms of equivalent airspeed, $V_{IE}$ is the instantaneous speed in terms of equivalent airspeed, and $V_W$ is wind speed, and σ is air density ratio.

10. A safe takeoff monitoring method for an airplane, the method comprising:
sensing parameters indicating the actual speed of the aircraft using electronic sensors onboard the airplane;
using at least one processor, continually computing parameters in response to the sensing, including the distance from the current position of the airplane to takeoff rotation speed $V_R$ and the instantaneous distance between $V_1$ and $V_R$, and using said computed distances to compare to the last point of usable runway ahead of the airplane on the runway the airplane is using for takeoff, the automatic processor determining based on the comparison whether distance required for stopping the airplane is available on the runway, and using the at least one processor, issuing a warning to the pilot to abort takeoff if the sensed parameters indicate the actual airplane speed value does not exceed the takeoff rotation speed $V_R$ and the remaining distance on the runway from the present position of the airplane is adequate for the airplane to stop on the runway.

11. The method of claim 10 further including computing airplane actual instantaneous weight.

12. The method of claim 10 further including computing minimum acceptable takeoff rotation speed $V_R$.

13. The method of claim 10 further including computing distances required to attain rotation, lift-off and 35 foot-height above the runway, considering an all-engine-operating condition.

14. The method of claim 10 further including evaluating the energy absorbable by the airplane brakes in case of an aborted takeoff.

15. The method of claim 10 further including evaluating the climb gradient available at lift-off, considering an all-engine-operating condition.

16. The method of claim 10 further including warning the pilot to abort takeoff if a large deviation is detected between the airplane weight as determined by the automatic processor and one inputted by the pilot.

17. The method of claim 12 further including warning the pilot to abort takeoff if takeoff rotation speed $V_{R,P}$ proposed by the pilot is lower than the minimum acceptable takeoff rotation speed $V_R$ for actual airplane operating conditions.

18. The method of claim 10 further including issuing an abort warning only when the airplane energy is within the absorption capability of the airplane brakes.

19. A safe takeoff monitoring system for an airplane, the system comprising:
sensors onboard the airplane that detect parameters relating to airplane weight and also sense parameters indicating the airplane speed;
a pilot-interface system,
a takeoff data consistency checker,
a calculation unit including a thrust calculator, equivalent air speed calculator and airplane weight calculator,
a VR calculation unit that calculates minimum VR, determines instantaneous distance from V1 to VR, uses said computed instantaneous distance from V1 to VR to compare to the last point of usable runway ahead of the airplane on the runway the airplane is using for takeoff at speed VR in terms of equivalent airspeed, calculates data from VR to V35, and applies safety criteria,
an available climb capability calculator,
a stopping distance calculator,
a brake energy calculator, and
a pilot warning system operatively coupled to the above-mentioned calculators that, based on the comparison, conditionally issues a warning to the pilot to abort takeoff if the sensed parameters indicate the actual airplane speed value does not exceed VR in terms of equivalent airspeed and the remaining distance on the runway is adequate for the airplane to stop on the runway.

* * * * *